United States Patent [19]

Wright et al.

[11] Patent Number: 4,476,430
[45] Date of Patent: Oct. 9, 1984

[54] NON-CONTACT SENSOR FOR DETERMINING MOVING FLAT STEEL STRIP SHAPE PROFILE

[76] Inventors: Wade S. Wright, 6136 Stonehill Dr., Fairfield, Ohio 45014; John T. Voisine, 7027 Dalewood Dr., Middletown, Ohio 45042; Glenn S. Huppi, 6492 Coachlight Way, West Chester, Ohio 45069

[21] Appl. No.: 365,791

[22] Filed: Apr. 5, 1982

[51] Int. Cl.³ .............................................. G01R 27/26
[52] U.S. Cl. .................................. 324/61 R; 324/61 P
[58] Field of Search ........................... 324/61 R, 61 P

[56] References Cited

U.S. PATENT DOCUMENTS 2,950,436 8/1960 Butticaz et al. ............... 324/61 R
3,042,861 7/1962 Brys .
3,161,824 12/1964 Brys .
3,471,780 10/1969 Beddows ........................ 324/61 R
3,502,968 3/1970 Tobin, Jr. et al. .
3,523,246 8/1970 Hall et al. ........................ 324/61 R
3,764,899 10/1973 Peterson et al. ................. 324/61 R
3,771,051 11/1973 Abbe ................................ 324/61 R
3,781,672 12/1973 Maltby et al. .
4,287,471 9/1981 Ko et al. .

FOREIGN PATENT DOCUMENTS 150937 9/1981 Fed. Rep. of Germany .... 324/61 R

OTHER PUBLICATIONS

Okado et al., A New Shape Control Technique for Cold Strip Mills, paper presented at the Rolling Mill Conference of the Association of Iron & Steel Engineers in Cincinnati, Ohio, May 1981, pp. 1-31.
Kokan, NKK-Type Shape Meter for Steel Strip, pp. 1-32.

Primary Examiner—Stanley T. Krawczewicz

[57] ABSTRACT

Method and apparatus for monitoring the flatness characteristic of a moving electrically conducting strip of material by continuously measuring the change in capacitance between the strip surface and a fixed point adjacent the surface. The capacitance is measured by means of a sensor having an active plate surrounded by a guard plate for eliminating stray capacitance, both plates being impressed with a high frequency signal. Changes in capacitance associated with both plates are eliminated while changes in capacitance associated with only the active plate are covered to a voltage proportional to the inverse of the spacing between the active plate and the strip surface. A plurality of the sensors may be spaced across the width of the plate for providing a profile of the strip flatness characteristics. The sensor finds particular application for monitoring and characterizing bottom buckles in steel strip following high temperature annealing.

5 Claims, 6 Drawing Figures

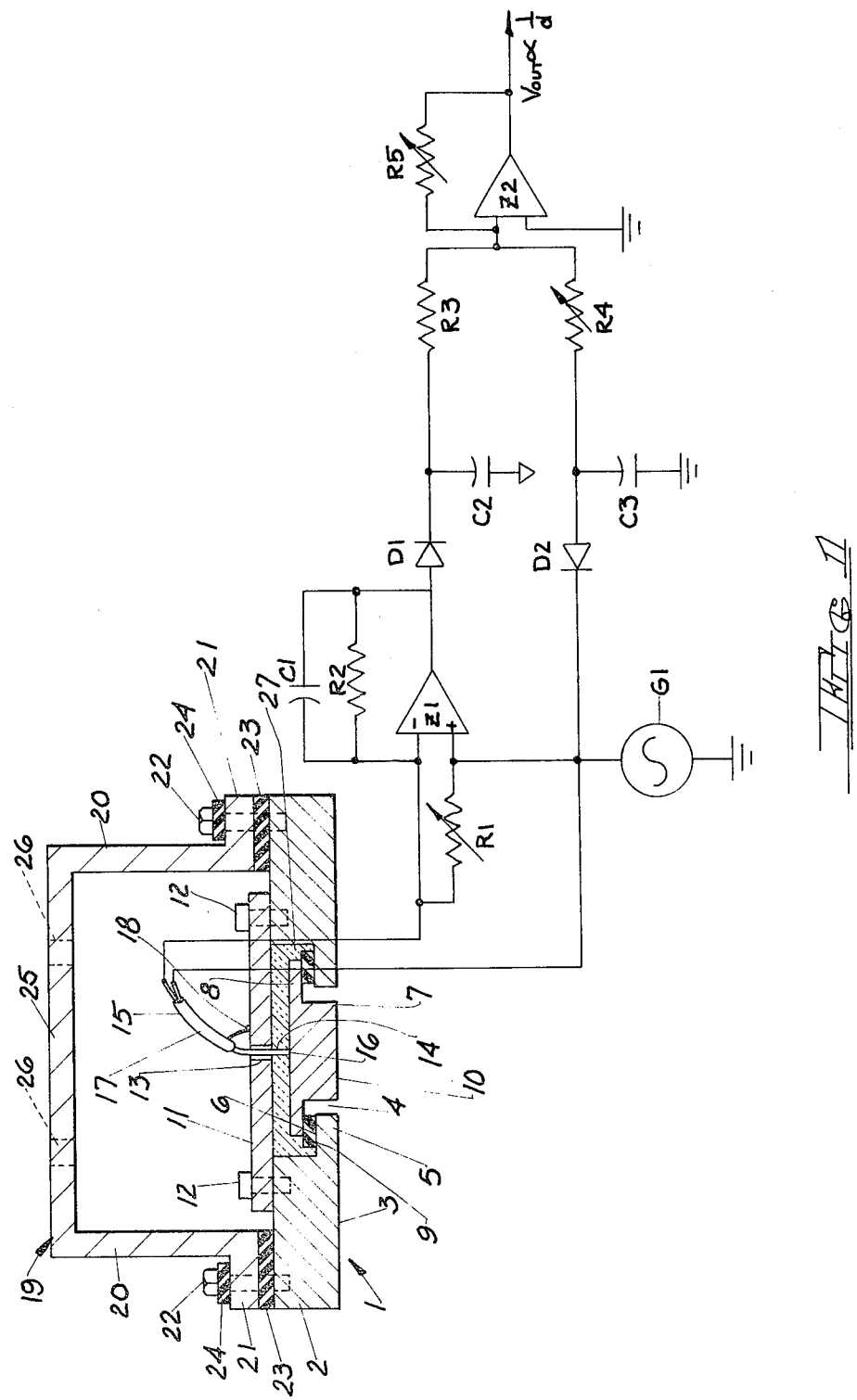

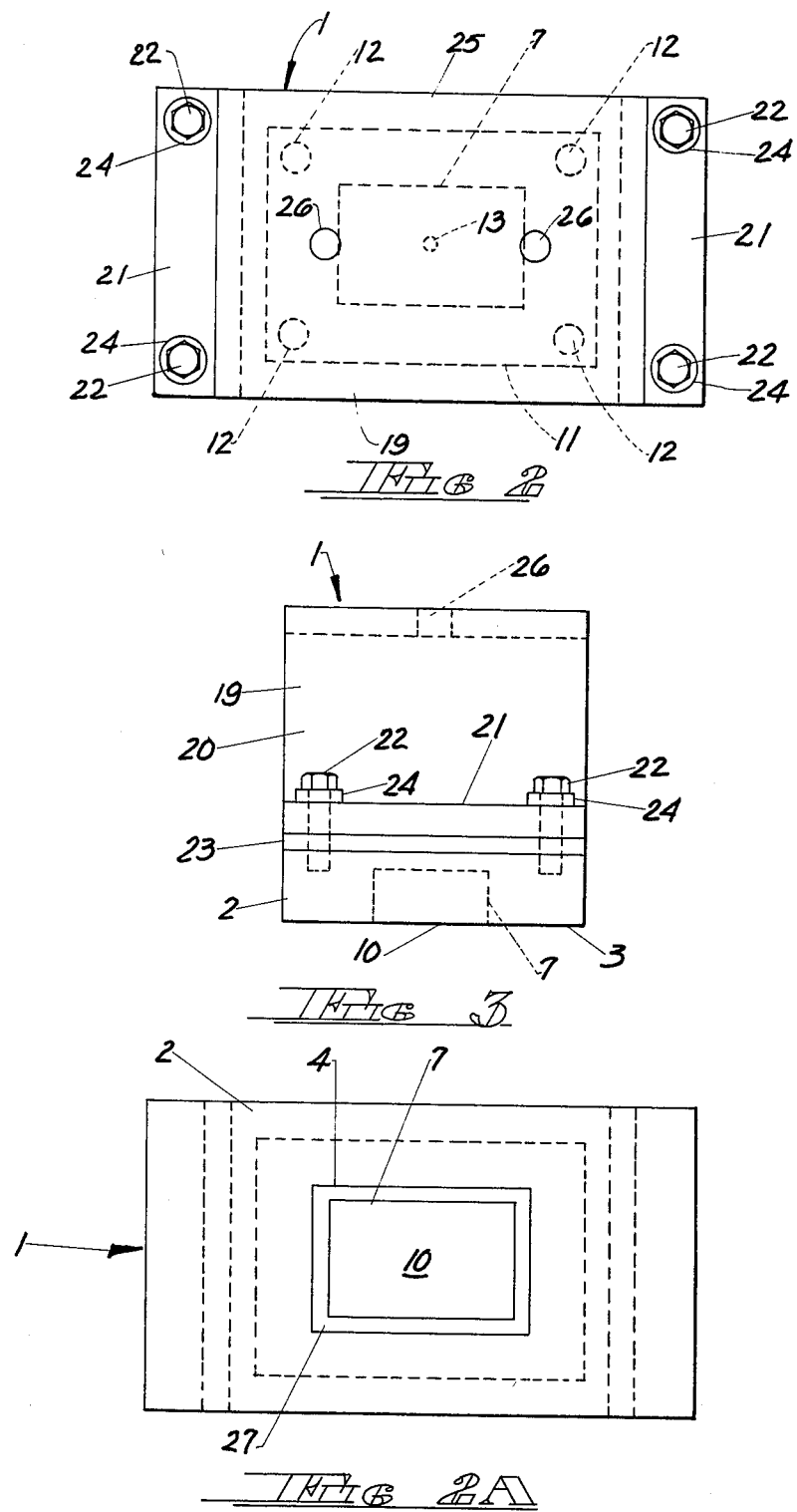

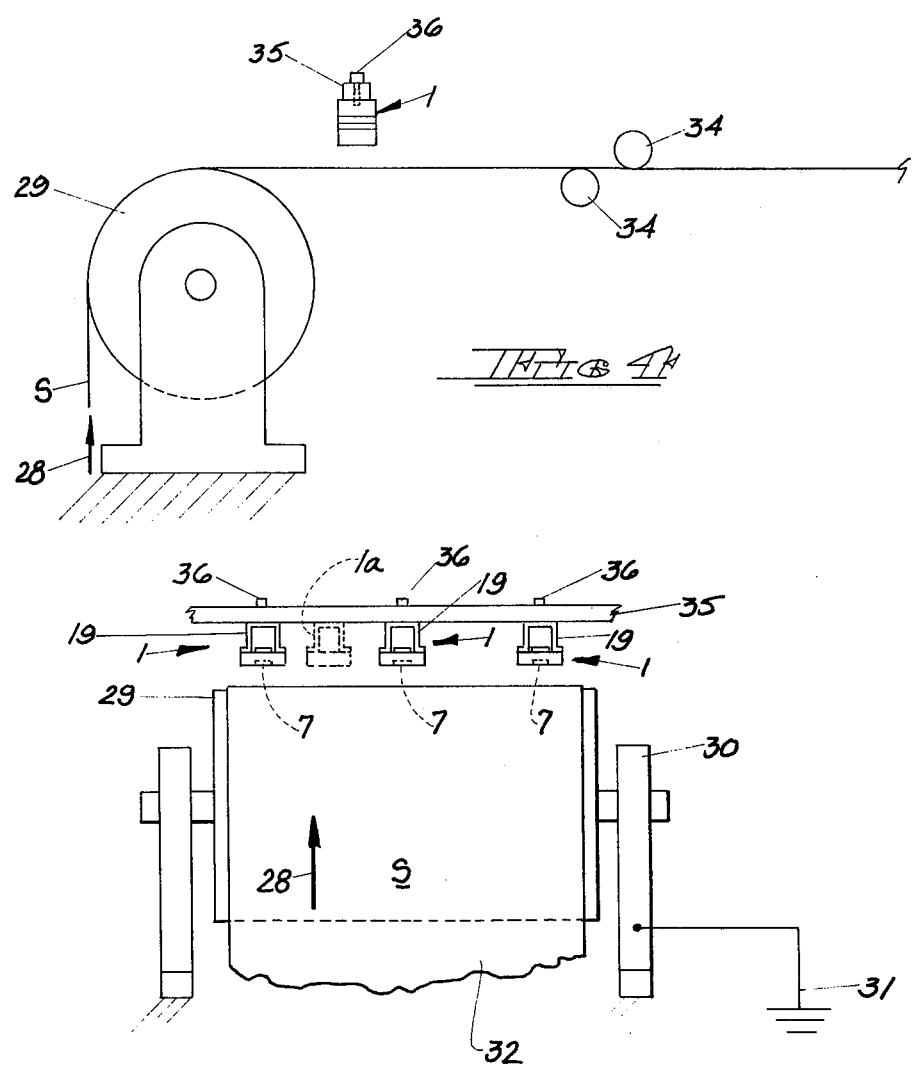

NON-CONTACT SENSOR FOR DETERMINING MOVING FLAT STEEL STRIP SHAPE PROFILE

SUMMARY OF THE INVENTION

The present invention is directed to a sensor for monitoring the profile or flatness characteristics of a moving flat electrically conducting steel or other metallic strip, and more particularly to a sensor of this type which measures the change in electrical capacitance between the moving strip surface and the sensor due to variations in the flatness of the strip.

The present invention finds particular utility in connection with processes for manufacturing steel strip, particularly strip of the type having a mill glass coating of magnesium silicate or the like. Often, the strip material in coiled form is subjected to a final anneal where it is heated to a relatively high temperature. In some cases, the annealed strip may exhibit what are known as "bottom buckles" or wavy-shaped strip edges. At other times, long edges or full centers may result in the treated strip material.

All of these characteristics are undesirable, especially in applications requiring particular degrees of strip flatness. In some cases, a significant length of the strip may be unusable if the buckle or waviness is extensive. In other applications, some degree of buckle or waviness may be tolerated.

In all events, it is desirable to be able to continuously monitor the flatness characteristics of the strip at particular points in the processing line in order to ascertain whether additional flattening or heat treating steps may be necessary.

The present invention is directed to a sensor for determining the degree of flatness of such steel strip while the strip is moving along a processing line, where speeds may approach several hundred feet per minute. The sensor is placed out of contact with the strip surface to eliminate wear of the sensor and prevent abrasion or scratching of the strip surface or of the coating which may be placed thereon.

Sensors of this general type have been suggested by prior art workers. For example, U.S. Pat. No. 3,161,824 issued Dec. 15, 1964 to H. E. Brys describes a method for measuring the flatness of steel materials without actually contacting the material by means of one or more wound coils which monitor changes in the permeability of the magnetic circuit formed as the material passes adjacent to the sensing coil. The changes in permeability measured may then be related to deviations in the flatness of the material.

In another type of method described in U.S. Pat. No. 3,502,968 issued Mar. 24, 1970 to H. G. Tobin, Jr., et al, a high frequency coil induces eddy currents in the surface of a moving sheet of material with pick-up coils sensing changes in the eddy current level in the sheet due to variations in the flatness.

While such inductive and eddy current measuring systems are satisfactory for small deviations, it has been found that they may produce inaccurate results for relatively large deviations of the order of two inches, for example. Furthermore, such methods are non-linear and are sensitive to the magnetic properties of the particular material being measured.

The sensor of the present invention measures the capacitance between the sensor and the surface of the moving electrically conducting steel strip to provide a measure of the flatness characteristic of the strip.

In a preferred embodiment, the continuous flatness measuring means includes means for electrically grounding the strip material. In a preferred installation, the strip is supported by a rotatably mounted cylindrical turn-down roll with the strip material being wrapped partially about the surface of the roll. A pair of closely spaced rotatably mounted cylindrical off-set rolls are spaced a distance from the turn-down rolls such that the strip material passes between the off-set rolls and is substantially unsupported in a catenary curve between the points of contact with the turn-down and off-set rolls. At least one of the turn-down or off-set rolls is electrically grounded so as to ground the strip material as it passes thereover. In many instances, the strip material may bear an electrically non-conducting coating on its major surfaces such as a mill coating. In all events, it is desirable that the strip have a very low impedance (i.e. high capacitance) to ground compared to the impedance of the sensor.

The sensor itself is positioned between the turn-down roll and the off-set rolls in spaced overlying relationship with one major surface of the strip so as to measure changes in capacitance as the distance varies between the capacitance measuring means and the moving strip surface. There results an electrical signal which is inversely proportional to the distance between the capacitance measuring sensor and the surface of the strip. Variations in this voltage thus provide an indication of the flatness characteristic of the moving strip.

In a preferred embodiment, the sensor comprises a generally rectangular flat electrically conducting active plate which is mounted in spaced parallel overlying relationship with the top or bottom major surface of the moving steel strip. A generally flat electrically conducting shield plate is also positioned in spaced parallel overlying relationship with the same major surface of the moving steel strip, and includes a rectangular central opening slightly larger than the active plate. The active plate is positioned within the opening out of electrical contact with the shield plate with the surfaces facing the moving steel strip of both plates coextensive with each other. Consequently, the shield plate reduces the fringing of the electric field produced by the active plate so that the variations in capacitance between the active plate and the surface of the moving steel strip may be measured.

Identical high frequency electrical signals are applied to the active and shield plates. This arrangement prevents the system from being responsive to extraneous changes in capacitance. Changes in capacitance between the active plate and the moving steel strip cause a corresponding change in current from the voltage source. This change in current is converted to a voltage proportional to the inverse of the distance between the active plate of the sensor and the strip. If desired, the voltage may be rectified and low pass filtered to provide a DC voltage also proportional to the inverse of the sensor-strip distance, thereby providing an indication of decreases in spacing.

A plurality of the sensors may be placed across the width of the strip to provide a measurement of the flatness characteristics of the entire strip width. Further features of the invention will become apparent from the detailed description which follows.

BRIEF DESCRIPTION OF THE DRAWING

FIG. 1 is a partially cross sectioned front elevational view of a preferred embodiment of the sensor of the present invention and a schematic diagram of the associated processing electronics used therewith.

FIG. 2 is a top plan view of the sensor of FIG. 1.

FIG. 2A is a bottom plan view of the sensor of the present invention.

FIG. 3 is an end elevation view of the sensor of FIG. 1.

FIG. 4 is a fragmentary partially diagrammatic side on view of a preferred mounting arrangement for the strip sensor of the present invention.

FIG. 5 is a fragmentary front elevation view of a preferred mounting arrangement of the strip sensor of the present invention using a plurality of sensors.

DETAILED DESCRIPTION

The sensor of the present invention is illustrated generally at 1 in FIGS. 1-3. Sensor 1 includes a flat shield plate 2 fabricated from any suitable electrically conducting material such as aluminum or the like. The lowermost surface 3 of shield plate 2 which will face the uppermost surface of the moving steel strip is flat. The central portion of shield plate 2 is provided with a rectangular-shaped opening 4 extending completely through the plate. The lower portion of opening 4 adjacent surface 3 is provided with an inwardly directed ledge or shelf 5 having a flat upper surface 6.

Sensor 1 also includes a generally rectangular-shaped active plate 7 which may be fabricated from any suitable electrically conducting material such as aluminum or the like. The upper portion of active plate 7 is provided with an outwardly directed flange 8 having a generally smooth lower surface. An annular electrically non-conducting gasket 9 is positioned on the upper surface 6 associated with shield plate 2 so that the ledge 8 may rest on the upper surface of gasket 9. Consequently, the inwardly directed ledge 5 supports active plate 7 while being electrically insulated therefrom. In the embodiment illustrated, active plate 7 and shield plate 2 may be secured together by means of an electrically non-conducting adhesive or the like. It will be observed that the lowermost surface 10 of active plate 7 is substantially coextensive with the lowermost surface 3 of shield plate 2. It will also be understood that other shapes and configurations of the active and shield plates may be used.

A generally flat electrically conducting cover plate 11 overlies opening 4 and is secured around its outer periphery to shield plate 2 by means of screws or the like 11. A central opening 13 is provided through cover plate 12 for admitting the central conductor 14 of coaxial cable or the like 15. Central conductor 14 is electrically secured to the upper surface of active plate 7 as at 16 (see FIG. 1). It will be understood that central conductor 14 is electrically isolated from cover plate 11. The cable shield 17 of coaxial cable 15 is attached to the upper surface of cover plate 11 as at 18. It will be understood that cable shield 17 may be covered with a suitable electrically non-conducting covering as is well understood in the art.

The upper portion of sensor 1 is provided with a U-shaped support bracket shown generally at 19. Support bracket 19 includes a pair of spaced generally vertically extending flange portions 20 terminating at their lowermost ends in outwardly extending legs 21. Support bracket 19 may be secured to shield plate 2 by a plurality of screws or the like 22 passing through cooperating holes in legs 21 and the upper surface of shield plate 2. As best shown in FIG. 1, support bracket 19 is insulated from shield plate 2 by means of an electrically non-conducting gasket or layer 23 fabricated from rubber, plastic, Teflon or the like positioned between the lower surface of legs 21 and the upper surface of the shield plate. Likewise, the upper portion of screws 22 is also insulated as at 24 from legs 21 so as to provide complete electrical isolation between support bracket 19 and shield plate 2.

The upper portion of support bracket 19 which comprises a generally horizontally extending web section 25 is provided with a plurality of apertures 26 for attaching the sensor 1 to a support member overlying the moving steel strip as will be described in more detail hereinafter.

If desired, the open spaces within opening 4 between shield plate 2 and active plate 7 may be filled with a suitable insulating material 27. In any event, it will be understood that active plate 7 is completely electrically isolated from shield plate 2.

Center conductor 14 of coax cable 15 is connected to the inverting input of a high input impedance operational amplifier Z1, while the cable shield is connected to the non-inverting input of amplifier Z1 as well as a high frequency alternating voltage source or oscillator G1, which has a nominal operating frequency of about 100 KHz. A variable resistor R1 is connected between the inverting and non-inverting inputs of amplifier Z1 for temperature compensation. The parallel combination of a resistor R2 and a capacitor C1 is connected between the inverting input and output of the operational amplifier.

The output of amplifier Z1 is connected to the anode of diode D1. The cathode of the diode is connected through a low pass filter formed by capacitor C2 and resistor R3 to the inverting input of operational amplifier Z2. Voltage source G1 is connected to the cathode of diode D2. The anode of diode D2 is connected through a low pass filter formed by capacitor C3 and variable resistor R4 to the inverting input of amplifier Z2. Variable resistor R4 serves as a zero adjustment. A variable resistor R5 is connected between the inverting input and the output of amplifier Z2 and serves as a gain adjustment, while the non-inverting input of amplifier Z2 is grounded. The voltage, $V_{out}$, which appears at the output of amplifier Z2, is proportional to the inverse of the distance between the active plate and the outer surface of the moving steel strip.

In operation, substantially the same high frequency signal is applied to the active plate 7 through center conductor 14 of the coax cable and to the shield plate 2 through the cable shield 17. The common mode characteristics of amplifier Z1 as well as the peak detector circuits formed by diodes D1 and D2 operate to cancel the common signals between the shield and active plate at the input to amplifier Z2. Strip shape can be more accurately measured by using a peak-to-peak detector which reduces the effect of variations not related to strip shape. The presence of the same high frequency signal on the shield plate and the cover plate tends to eliminate the effects of stray capacitance so that the active plate 7 is responsive only to changes in capacitance between it and the moving steel strip. When such a change in capacitance occurs, the current through resistor R2 and capacitor C1 changes, producing a voltage change at the output of amplifier Z1, which functions similarly to a differentiator. In the case where a positive voltage occurs at this point associated with an increase in capacitance associated with a decrease in the spacing between the active plate and the steel strip, current flow will occur through diode D1 and appear as a voltage change on the output of amplifier Z2 which is proportional to the change in capacitance of the strip. The voltage $V_{out}$ may be applied to a strip chart recorder or other processing means for analyzing or categorizing the variations in the strip flatness.

It is to be understood that any means which reduces the influence of the environment will improve the performance of the system. As an example, a temperature controlled environment would reduce the frequency of calibration and also improve the accuracy between calibrations.

A typical installation of the sensor 1 of the present invention is illustrated in FIG. 4 and FIG. 5. The steel strip S of indefinite length moves in the direction of arrow 28 between processing stations as described hereinabove. It is supported by a cylindrical rotatably mounted roll, which may be a turn-down roll, which is borne by a support 30. In all events, and however accomplished, it is only necessary that the strip have a very low impedance (i.e. high capacitance) to ground compared to the impedance of the sensor 1. One way of accomplishing this is by grounding support 30 as at 31, although this may not be necessary in particular applications.

Following the point of contact with the turn-down roll, strip S proceeds in a generally horizontal direction between a pair of spaced cylindrical rotatably mounted off-set rolls 34. The portion of the strip S extending between turn-down roll 29 and off-set rolls 34 is generally unsupported and will form a slight catenary curve. In applications where significant changes in tension of the strip may occur which might result in a bouncing motion, the lowermost surface of the strip may be supported by rollers or the like.

One or more of the sensors 1 previously described may be positioned in closely spaced overlying relationship with the upper surface of strip S. While for purposes of an exemplary showing, sensors 1 have been described and illustrated as positioned above the strip, it will be understood that they may alternatively be positioned beneath the strip, or in any other position where the outer surface of active plate 7 is spaced in parallel relationship with a major surface of the moving strip.

In the embodiment illustrated in FIG. 4 and FIG. 5, three sensors 1 have been utilized spanning the width of the strip. However, it will be understood that a single sensor may be used, for example in the area most likely to contain the bottom buckle, or more sensors may be used depending on the resolution of strip flatness characteristics desired. Alternatively, a greater number of sensors 1 may be placed in a particular area of interest of the strip, such as the bottom buckle region, as shown by sensor 1a in FIG. 5.

Each sensor 1 may be attached to a support rod or bar 35 extending horizontally transversely of the strip width. The sensor 1 is secured to support bar 35 by means of screws or the like 36 cooperating with holes 26 in support bracket 19 so that the entire sensor depends downwardly from bar 35 and the long dimension of active plate 7 extends transversely to the direction of strip travel. In the case where a plurality of sensors is utilized, the high frequency oscillator G1 associated with each sensor may be operated at a different frequency, e.g. 95 KHz, 100 KHz and 105 KHz, with appropriate filters, if required, to prevent cross-talk between the sensors.

In operation, the sensor is first calibrated to operate over the range of about 1–5 inches. This permits measurement of deviations in the strip surface of up to $\pm 2$ inches. As the distance between the upper surface of the strip and the active plate varies, the capacitance changes, producing a change in $V_{out}$ as previously described. The tension can be controlled so as to eliminate bouncing of the strip, or the common voltage changes among the sensors may be eliminated so that they are responsive only to changes in flatness of the strip surface. Furthermore, automatic processing may use the output voltage signal for measuring the actual deviation, the period of the edge wave, or for grading of various strip shapes. The system is inexpensive, flexible and able to operate in the severe mill environment.

It will be understood that various details in the changes, material, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. A non-contact sensor for measuring changes in capacitance between the sensor and a major surface of a moving electrically conducting strip of indefinite length comprising:
   a centrally located electrically conducting active plate having a generally planar undersurface configured to be positioned in spaced parallel relationship with a major surface of the strip;
   an electrically conducting shield plate having a generally planar undersurface and a central opening configured to nestingly accept said active plate such that said active and shield plate surfaces are substantially coplanar;
   means for electrically isolating said active and shield plates;
   an oscillator producing a high frequency output signal connected to said shield plate for impressing said signal on said shield plate;
   a differential amplifier having a first differential input electrically connected to said active plate and a second differential input electrically connected to said oscillator output and said shield plate; and
   means for subtracting the output signals from said amplifier and said oscillator to eliminate common signals between said shield and active plates and produce an electrical output signal representative of the capacitance between said active plate and the major surface of the strip.

2. The apparatus according to claim 1 including an electrically conducting cover plate disposed in spaced relationship with the surface of the active plate facing away from the strip surface and in electrical contact with said shield plate such that said active plate is surrounded on all sides except for the surface facing the strip surface by the electrically conducting cover and shield plates.

3. The apparatus according to claim 1 wherein said subtracting means comprises a first low pass filter and a first diode connected between the output of said amplifier and said filter, a second low pass filter and a second diode connected between said oscillator and said low pass filter in opposite polarity to said first diode, and a second amplifier for summing the outputs from said first and second low pass filters, the output from said second amplifier comprising a voltage proportional to the capacitance between the active plate and the strip surface.

4. The apparatus according to claim 3 including variable resistor means connected between said first and second differential inputs for compensating for changes in temperature and adjustment means for balancing the outputs from said filters.

5. The apparatus according to claim 1 wherein said active plate is rectangular in shape, the long dimension of the plate configured to extend across the strip width.

* * * * *